UNITED STATES PATENT OFFICE.

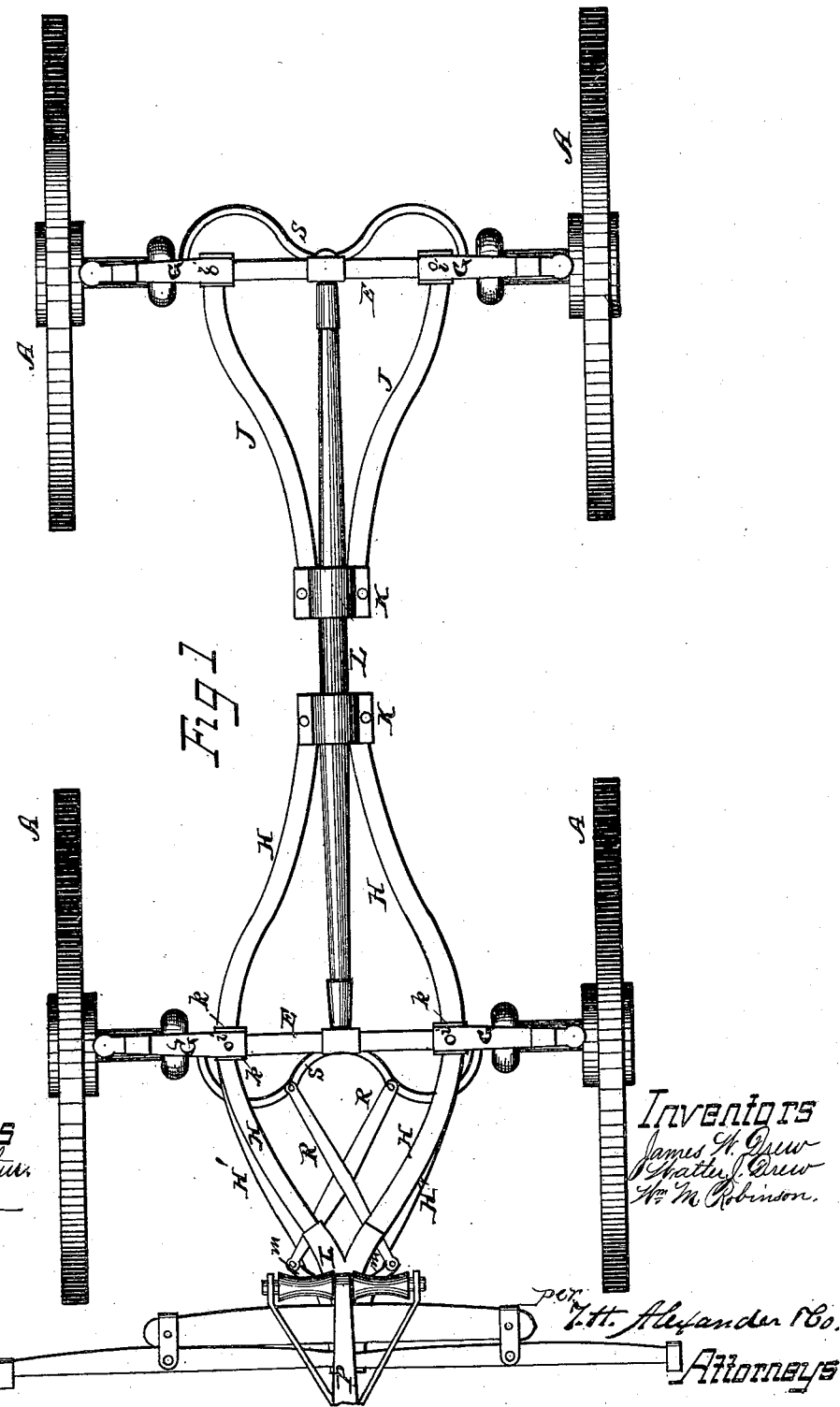

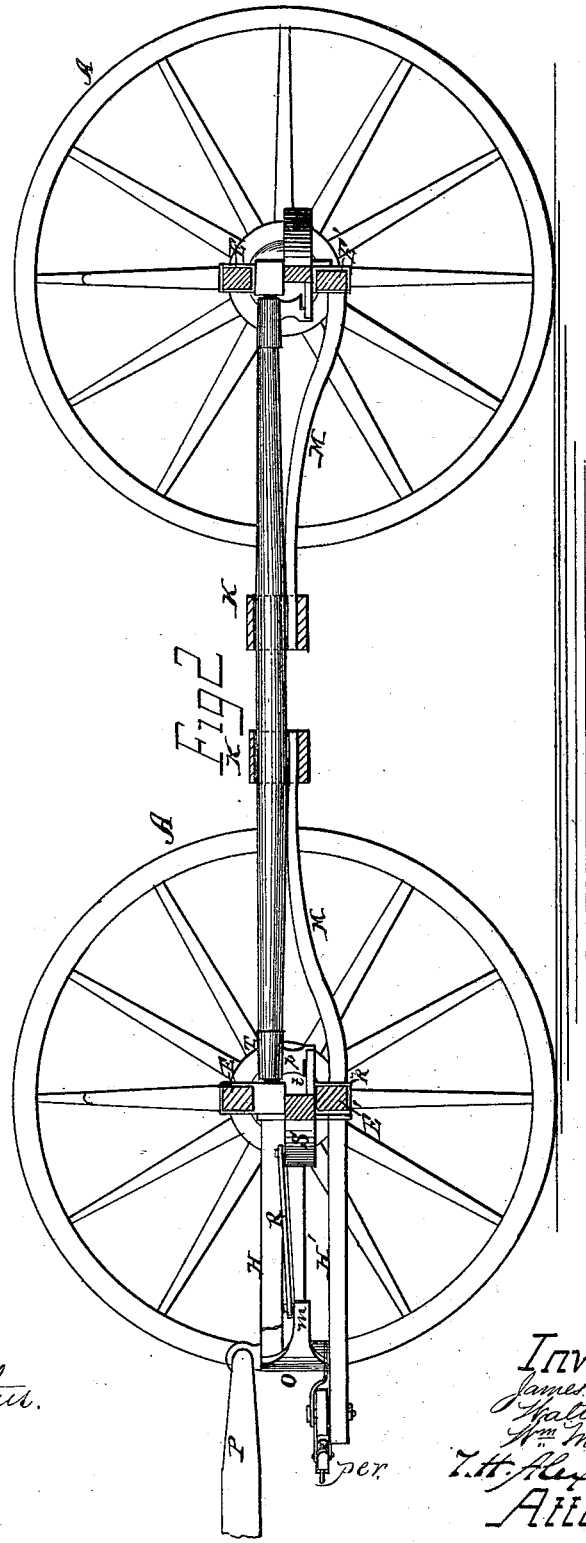

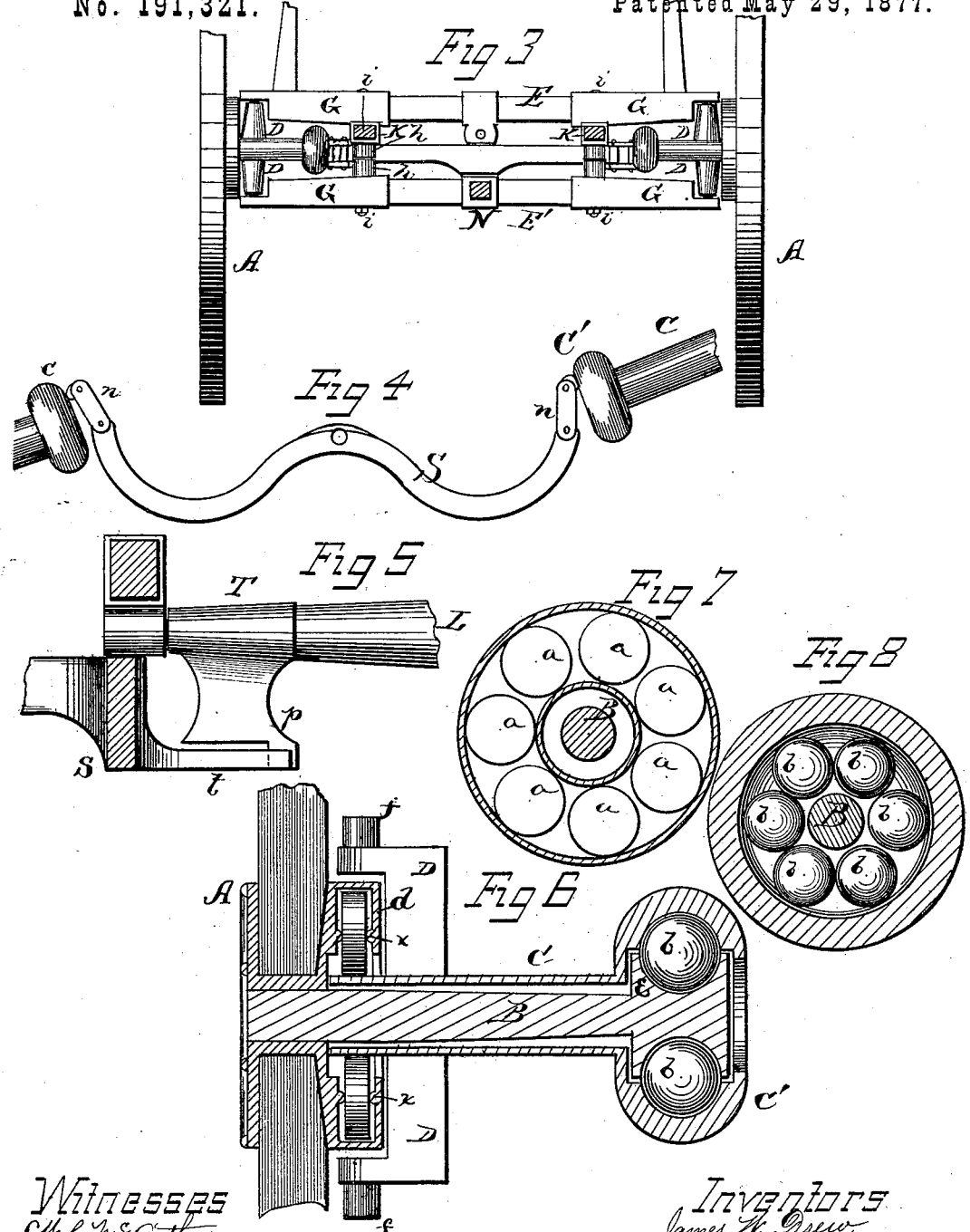

JAMES W. DREW, WALTER J. DREW, AND WILLIAM M. ROBINSON, OF GRAND RAPIDS, MICHIGAN.

IMPROVEMENT IN VEHICLE RUNNING-GEARS.

Specification forming part of Letters Patent No. 191,321, dated May 29, 1877; application filed March 19, 1877.

*To all whom it may concern:*

Be it known that we, JAMES W. DREW, WALTER J. DREW, and WM. M. ROBINSON, of Grand Rapids, in the county of Kent and State of Michigan, have invented certain new and useful Improvements in Vehicles; and we do hereby declare the following to be a full, clear, and exact description thereof, reference being had to the accompanying drawings, and to the letters of reference marked thereon.

The nature of our invention consists in the construction and arrangement of a four-wheeled vehicle, as will be hereinafter more fully set forth.

In order to enable others skilled in the art to which our invention appertains to make and use the same, we will now proceed to describe its construction and operation, referring to the annexed drawings, which form a part of this specification, and in which—

Figure 1 is a plan view of our invention. Fig. 2 is a longitudinal section of the same. Figs. 3 to 8 inclusive are enlarged detailed views of parts thereof.

A A represent the wheels of the wagon, each of which is provided with an independent axle, B, having its bearing upon anti-friction wheels $a$ $a$ and balls $b$ $b$. The wheels $a$ $a$ travel on the inside of a hollow rim, $d$, projecting from the inner end of the hub of the wheel, and said wheels bear upon the outer end of a tubular chair, C, having an enlarged head, C', at its inner end. The inside of each hub is hollow, or formed with the hollow rim $d$ to receive the wheels $a$, which are seven in number, more or less, and travel around on the inside of the hub as the wheel revolves, while the opposite sides of the said wheels travel around on the chair C, which is made just large enough to fill up the vacant place in the center of the hub, after the wheels $a$ have been placed therein. These chairs C receive all the weight of the load, their outer ends bearing on the face of the wheels $a$ in the hub, and as the hub revolves the wheels $a$ must travel around on the end of the chair, while their opposite sides will bear and travel on the inside of the hub at or near its circumference.

The axle B of each wheel A is fastened firmly in the hub, and revolves with said wheel. It projects through the center of the chair C, the bore of the chair being larger than the axle, so as not to allow it to touch the chair. At the inner end of the axle is fastened a round block, $e$, provided with a half-round circumferential groove of sufficient depth to receive one-half of a perfectly round ball, $b$.

In this groove are placed six balls, $b$, more or less, which travel around therein as the axle revolves, while the opposite sides of the balls from the axle are traveling in a corresponding groove around the inside of the head C' at the inner end of the chair, the balls acting as bearings for one end of the axle, the same as the wheels $a$ in the hub, and their globular shape gives them the power of holding on and to its place the wheel A without the use of a nut or linchpin. The wheels $a$ being flat, and the inside of the hollow hub or rim $d$, next to said wheels, being correspondingly flat, more or less friction would naturally be created, as their broad sides would occasionally come in contact; but to obviate this difficulty the inside surfaces of the hollow hub or rim $d$, on either side of the wheels $a$, are provided with beads $x$ $x$ concentric with the hub, and at such distances from the center as to strike the anti-friction wheels $a$ at their centers, so as to make as little friction as possible when they come in contact.

The chair C is, near the outer end, provided with two arms, D D, extending at right angles therewith in opposite directions, the outer ends of said arms extending over the hollow hub or rim $d$, and provided with outwardly-extending pivots $f f$ on a line with the wheels $a$, which pivots serve as a king-bolt for the wheel A to turn upon when cramping, making the operation of each wheel independent of the others, both in its revolution and in the shifting of its direction.

The wagon-bolsters for the front and for the rear wheels are made in two parts—a top bolster, E, and a bottom bolster, E', each of which is provided at the ends with metal caps G G. Each cap G has a projecting tube, $h$, pointing toward the opposite cap and meeting midway between the two bolsters, through which tubes bolts $i$ are passed with screw-nuts on their lower ends for fastening them. The caps G are also provided with sockets $k\ k$ above and below the tubes $h\ h$ on the front side of the front bolster, to receive braces H H'. The caps of the rear bolster E have also similar sockets on the front side to receive braces J J.

The opposite ends of the braces H H and J J have their fastening in reach-brackets K K, through which the reach L passes in a round form, so as allow it to turn in said brackets when cramping or turning the wagon. These brackets are provided on their under sides with sockets to receive the ends of the braces M M, in order to brace the gearing at right angles with the other braces. The other ends of the braces M M are fastened in clasps N N at the centers of the lower bolsters E' E', through which the wood part of said bolsters passes, making a T-shaped clasp for holding firmly the intersecting-braces M M.

The upper braces H H pass through the sockets of the top caps on the front bolster E, and continue back and fasten in the front reach-bracket K, and the front ends of said upper braces H are secured firmly by means of a V-shaped sleeve-bracket, I.

The lower front braces H' are fastened in the sockets $k$ in the caps of the front lower bolster E', and thence project forward, and running parallel with the upper braces H, meet in the form of a V, and are fastened with bolts.

Between the front ends of these four parallel braces is placed the tongue-bracket O, constructed, as shown in Fig. 2, for securing the tongue or draft pole P, and braces R R, which are pivoted thereto by rivets through the bracket-arms $m\ m$, and said braces connect with the arms of a curved lever, S. (Shown fully in Fig. 4.) This lever is hung centrally on pivots between the front bolsters E E', and the outer ends of said levers are fastened by means of stirrup-straps $n\ n$ to the inner ends of the chairs C C, by means of which said chairs are caused to swing upon their pivots $f\ f$, thereby forming a compound lever from the switch end of the draft-pole P to the wheels A A, for shifting its direction when cramping, it being understood that the braces or connecting bars R R cross each other, as shown in Fig. 1.

The lever S is provided with a slotted arm, $t$, extending rearward from its lower edge, which slotted arm receives the wing $p$ of a sleeve, T, fastened to the end of the reach, and by means of which said reach is made to turn in the brackets K, and as the rear end of the vehicle is provided with the same devices, and connected with the reach by means of a similar wing and slotted arm, the whole cramping arrangement is at once acted upon when moving the tongue either way in a horizontal direction, thereby bringing the corresponding parts into opposite directions for cramping when turning around.

The front braces H and H' projecting forward from the front bolster E E', are arranged substantially for the purpose of supporting draft-pole, and making its turning-point as far from the center of said bolster as possible, so as to give leverage in cramping or drawing the front end around when cramping, and also to prevent the horses from being crowded too close to the wheels, and to make the switch end of the tongue as short and light as possible; also, for the purpose of supporting and carrying the whiffletrees, and making the draw-bolt or turning-point at a proper distance ahead of the wheels, so as to prevent their being carried or turned into the wheels in short cramping, as would be the case if the whiffletrees were carried on the draft-pole, and had the turning-point back of the center of the bolster, as in ordinary wagons.

Having thus fully described our invention, what we claim as new, and desire to secure by Letters Patent, is—

1. The caps G, with their sockets $k$, to receive braces, and with tubes $h$ for holding the two bolsters a certain distance apart, substantially as shown and described.

2. The wheel-hub A, formed with a hollow rim, $d$, on its inner end, said rim being provided with the beads $x$, in combination with the wheels $a$ and chair C, substantially as and for the purposes herein set forth.

3. The tubular chair C, provided with the grooved head C' and arms D D, with pivots $f\ f$, as and for the purposes herein set forth.

4. The combination of the wheel A, having hollow rim $d$ on the inner end of its hub, the axle B with block $e$, pivoted chair C, wheels $a$, and balls $b$, all constructed and arranged substantially as and for the purposes herein set forth.

5. The combination of the tongue-bracket O with arms $m\ m$, tongue P, crossed braces R R, lever S, straps $n\ n$, and pivoted chairs C C, substantially as and for the purposes herein set forth.

6. The combination of the levers S S, having slotted arms $t\ t$, the reach L, sleeves T T, with pins $p\ p$, and the brackets K K, substantially as and for the purposes herein set forth.

7. The combination of the parallel front braces H H and H' H', sleeve I, and tongue-bracket O, substantially as and for the purposes herein set forth.

8. The combination of the bolster-caps G, braces H and J, reach-brackets K, with sockets, and the center braces M, substantially as and for the purposes herein set forth.

JAMES W. DREW.
WALTER J. DREW.
WM. M. ROBINSON.

Witnesses:
HENRY J. FELKER,
ANDREW J. REEVES.